(12) United States Patent
Mun et al.

(10) Patent No.: US 10,988,821 B2
(45) Date of Patent: Apr. 27, 2021

(54) WIRE ROD HAVING EXCELLENT COLD FORGEABILITY AND MANUFACTURING METHOD THEREFOR

(71) Applicant: POSCO, Pohang-si (KR)

(72) Inventors: Dong-Jun Mun, Pohang-si (KR); Geun-Soo Ryu, Pohang-si (KR); Sang-Yoon Lee, Pohang-si (KR); Jae-Seung Lee, Pohang-si (KR)

(73) Assignee: POSCO, Pohang-si (KR)

( * ) Notice: Subject to any disclaimer, the term of this patent is extended or adjusted under 35 U.S.C. 154(b) by 284 days.

(21) Appl. No.: 15/765,679

(22) PCT Filed: Nov. 11, 2016

(86) PCT No.: PCT/KR2016/013019
§ 371 (c)(1),
(2) Date: Apr. 3, 2018

(87) PCT Pub. No.: WO2017/082684
PCT Pub. Date: May 18, 2017

(65) Prior Publication Data
US 2019/0085422 A1   Mar. 21, 2019

(30) Foreign Application Priority Data

Nov. 12, 2015  (KR) .......................... 10-2015-0158817

(51) Int. Cl.
| | | |
|---|---|---|
| *C21D 8/06* | (2006.01) | |
| *C21D 9/52* | (2006.01) | |
| *C22C 38/02* | (2006.01) | |
| *C22C 38/04* | (2006.01) | |
| *C22C 38/06* | (2006.01) | |
| *C22C 38/00* | (2006.01) | |
| *C22C 38/24* | (2006.01) | |
| *C22C 38/26* | (2006.01) | |
| *C22C 38/28* | (2006.01) | |
| *C22C 38/18* | (2006.01) | |

(52) U.S. Cl.
CPC .............. *C21D 8/065* (2013.01); *C21D 8/06* (2013.01); *C21D 9/52* (2013.01); *C21D 9/525* (2013.01); *C22C 38/001* (2013.01); *C22C 38/02* (2013.01); *C22C 38/04* (2013.01); *C22C 38/06* (2013.01); *C22C 38/18* (2013.01); *C22C 38/24* (2013.01); *C22C 38/26* (2013.01); *C22C 38/28* (2013.01); *C21D 2211/005* (2013.01); *C21D 2211/009* (2013.01)

(58) Field of Classification Search
CPC .............. C21D 8/065; C21D 2211/005; C21D 2211/009; C21D 8/06; C21D 9/52; C22C 38/02; C22C 38/04; C22C 38/001; C22C 38/06; C22C 38/18; C22C 38/24; C22C 38/26; C22C 38/28
See application file for complete search history.

(56) References Cited

U.S. PATENT DOCUMENTS

| | | | |
|---|---|---|---|
| 6,386,810 B1 | 5/2002 | Onoe | |
| 2008/0156403 A1 | 7/2008 | Masuda et al. | |
| 2012/0263622 A1* | 10/2012 | Daitoh | ................... C21D 8/065 420/105 |
| 2018/0298464 A1* | 10/2018 | Mun | ....................... C22C 38/00 |
| 2019/0085422 A1* | 3/2019 | Mun | ....................... C21D 8/065 |

FOREIGN PATENT DOCUMENTS

| | | |
|---|---|---|
| CN | 102227512 A | 10/2011 |
| CN | 102597290 A | 7/2012 |
| JP | 2000-273580 A | 10/2000 |
| JP | 2001-247937 A | 9/2001 |
| JP | 2001-342544 A | 12/2001 |
| JP | 2003-321742 A | 11/2003 |
| JP | 2006-037159 A | 2/2006 |
| JP | 2006-274373 A | 10/2006 |
| JP | 2006-291237 A | 10/2006 |
| JP | 2008-007853 A | 1/2008 |
| JP | 2009-527638 A | 7/2009 |

(Continued)

OTHER PUBLICATIONS

International Search Report dated Feb. 10, 2017 issued in International Patent Application No. PCT/KR2016/013019 (with English translation).

(Continued)

*Primary Examiner* — Scott R Kastler
(74) *Attorney, Agent, or Firm* — Morgan, Lewis & Bockius LLP

(57) ABSTRACT

Disclosed are a wire rod and a manufacturing method therefor. The wire rod comprises in percentage by weight: 0.02 to 0.15% of C; 0.05 to 0.3% of Si; 0.5 to 1.2% of Mn; 0.3 to 0.9% of Cr; 0.02% or less of P; 0.02% or less of S; 0.01 to 0.05% of sol. Al; 0.01% or less of N; Fe as the remainder; and unavoidable impurities, wherein the wire rod satisfies following formulas 1 and 2, wherein, when the hardness of the wire rod measured in 1/2d position and in 1/4d position in the diameter direction of the wire rod is $Hv_{1/2d}(Hv)$ and $Hv_{1/4d}(Hv)$, respectively (here, d is the diameter of the wire).

$$(Hv_{1/2d} + Hv_{1/4d})/2 \leq 150 \quad \text{[Formula 1]}$$

$$Hv_{1/2d}/Hv_{1/4d} \leq 1.2 \quad \text{[Formula 2]}$$

14 Claims, No Drawings

(56) References Cited

FOREIGN PATENT DOCUMENTS

| | | |
|---|---|---|
| JP | 2009-242916 A | 10/2009 |
| JP | 2013-234349 A | 11/2013 |
| KR | 10-2001-0060772 A | 7/2001 |
| KR | 10-0605722 B1 | 8/2006 |
| KR | 2008-0063137 A | 7/2008 |
| KR | 10-1297539 B1 | 8/2013 |
| KR | 10-2015-0055499 A | 5/2015 |
| WO | 2006/057470 A1 | 6/2006 |
| WO | 2007/074986 A1 | 7/2007 |

OTHER PUBLICATIONS

Chinese Office Action dated Aug. 6, 2019 issued in Chinese Patent Application No. 201680066211.2 (with English translation).
Japanese Office Action dated May 21, 2019 issued in Japanese Patent Application No. 2018-517214.

* cited by examiner

WIRE ROD HAVING EXCELLENT COLD FORGEABILITY AND MANUFACTURING METHOD THEREFOR

RELATED APPLICATIONS

This application is the U.S. National Phase under 35 U.S.C. § 371 of International Application No. PCT/KR2016/013019, filed on Nov. 11, 2016 which in turn claims the benefit of Korean Patent Application No. 10-2015-0158817 filed on Nov. 12, 2015, the disclosures of which applications are incorporated by reference herein.

TECHNICAL FIELD

The present disclosure relates to a wire rod having excellent cold forgeability and a method for manufacturing the same, and more particularly, to a wire rod having excellent cold forgeability and a method for manufacturing the same, suitable for use as a material for vehicles or a material for machine components.

BACKGROUND ART

A cold working method has effects of having excellent productivity and a reduction in heat treatment costs, as compared to a hot working method or a machine cutting method, and is thus widely used for manufacturing materials for vehicles or materials for machine components such as nuts, bolts, or the like.

However, as described above, in order to manufacture a mechanical component using a cold working method, excellent cold workability of steel is essential. In detail, it is necessary for steel to have low deformation resistance during cold working, and to have excellent ductility. In this case, defective products may be generated because the service life of a tool used during cold working may be reduced if deformation resistance of steel is high, and because splitting may easily occur during cold working if ductility of steel is low.

Therefore, in the case of steel for cold working according to the related art, a spheroidizing annealing heat treatment is performed thereon before cold working. In this case, because, during the spheroidizing annealing heat treatment, steel is softened, deformation resistance is reduced, while ductility is improved, and thus, cold workability is improved. However, in this case, because additional costs may be incurred and manufacturing efficiency may be reduced, development of a wire rod capable of securing excellent cold workability without the need for an additional heat treatment has been required.

DISCLOSURE

Technical Problem

An aspect of the present disclosure may provide a wire rod in which excellent cold forgeability is secured without an additional heat treatment and a method for manufacturing the same.

Technical Solution

According to an aspect of the present inventive concept, a wire rod may include carbon (C): 0.02 wt % to 0.15 wt %, silicon (Si): 0.05 wt % to 0.3 wt %, manganese (Mn): 0.5 wt % to 1.2 wt %, chrome (Cr): 0.3 wt % to 0.9 wt %, phosphorus (P): 0.02 wt % or less, sulfur (S): 0.02 wt % or less, soluble aluminum (sol. Al): 0.01 wt % to 0.05 wt %, nitrogen (N): 0.01 wt % or less, iron (Fe) as a remainder, and unavoidable impurities, wherein the wire rod satisfies Formula 1 and Formula 2, when the hardness of the wire rod, measured in a 1/2d position and in a 1/4d position in the diameter direction of the wire rod, are $Hv_{,1/2d}$ (Hv) and $Hv_{,1/4d}$ (Hv), respectively, $$(Hv_{,1/2d} + Hv_{,1/4d})/2 \leq 150 \quad \text{[Formula 1]}$$

$$Hv_{,1/2d}/Hv_{,1/4d} \leq 1.2 \quad \text{[Formula 2]}$$

where d is the diameter of the wire.

According to an aspect of the present inventive concept, a method for manufacturing a wire rod may include: heating a billet, including carbon (C): 0.02 wt % to 0.15 wt %; silicon (Si): 0.05 wt % to 0.3 wt %; manganese (Mn): 0.5 wt % to 1.2 wt %; chrome (Cr): 0.3 wt % to 0.9 wt %; phosphorus (p): 0.02 wt % or less; sulfur (S): 0.02 wt % or less; soluble aluminum (sol. Al): 0.01 wt % to 0.05 wt %; nitrogen (N): 0.01 wt % or less; iron (Fe) as a remainder; and unavoidable impurities, in which a carbon equivalent (Ceq) defined by Equation 1 is 0.23 or more and 0.33 or less, and which satisfies Formula 3 and Formula 4; obtaining the wire rod by hot-rolling the billet having been heated under the conditions of a finish rolling temperature of 900° C. to 1000° C.; and cooling, after winding the wire rod, $$Ceq = [C] + [Si]/9 + [Mn]/5 + [Cr]/12 \quad \text{[Equation 1]}$$

$$1.2 \leq [Mn]/[Cr] \leq 1.8 \quad \text{[Formula 3]}$$

$$9.33[C] + 0.97[Mn] + 0.51[Cr] + 0.26[Nb] + 0.66[V] \leq 2.1 \quad \text{[Formula 4]}$$

where each of [C], [Si], [Mn], [Cr], [Nb], and [V] is the content (%) of a corresponding element.

Advantageous Effects

According to an exemplary embodiment in the present disclosure, a wire rod capable of sufficiently suppressing deformation resistance during cold working, even when a spheroidizing annealing heat treatment is omitted, may be provided.

The various features, advantages, and effects of the present invention are not limited to the above description, and can be more easily understood while describing a specific embodiment of the present invention.

BEST MODE FOR INVENTION

Hereinafter, a wire rod having excellent cold forgeability according to an aspect of the present disclosure will be described in detail.

The present inventors have examined a wire rod from various aspects to provide a wire rod capable of securing excellent cold forgeability while having a predetermined degree of strength after wire drawing. As a result, by appropriately controlling average hardness of a wire rod and a hardness ratio of a center segregation portion and a non-segregation portion of a wire rod, the present inventors have found that a wire rod in which cold forgeability is not deteriorated while having a predetermined degree of strength after wire drawing can be provided, thereby completing the present invention.

A wire rod of the present invention satisfies Formula 1 and Formula 2, when hardness of the wire rod measured in a 1/2d position and a 1/4d position (here, d is the diameter of the wire) in the diameter direction of the wire rod are Hv$_{1/2d}$(Hv) and Hv$_{1/4d}$(Hv), respectively. If the wire rod does not satisfy Formula 1, strength after wire drawing is significant, so cold forgeability may be deteriorated. If the wire rod does not satisfy Formula 2, cracking may occur in the wire rod during cold forging after wire drawing. Thus, cold forgeability may be deteriorated.

$$(Hv_{1/2d}+Hv_{1/4d})/2 \leq 150 \quad \text{[Formula 1]}$$

$$Hv_{1/2d}/Hv_{1/4d} \leq 1.2 \quad \text{[Formula 2]}$$

In order to satisfy Formula 1 and Formula 2, a wire rod of the present invention may have the following alloy composition and composition range. It is noted in advance that the content of each element described below is based on weight, unless otherwise specified.

Carbon (C): 0.02% to 0.15%

Carbon serves to increase strength of a wire rod. In the present invention, in order to have the effect described above, carbon is preferably included in an amount of 0.02% or more, more preferably included in an amount of 0.03% or more. However, if the content of carbon is excessive, deformation resistance of steel rapidly increases, and thus a problem in which cold forgeability is deteriorated may occur. Thus, an upper limit of the content of carbon is preferably 0.15%, more preferably 0.14%.

Silicon (Si): 0.05% to 0.3%

Silicon is an element useful as a deoxidizer. In the present invention, in order to have the effect described above, silicon is preferably included in an amount of 0.05% or more. However, if the content of silicon is excessive, deformation resistance of steel rapidly increases through solid solution strengthening, and thus, a problem in which cold forgeability is deteriorated may occur. Thus, an upper limit of the content of silicon is preferably 0.3%, more preferably 0.2%.

Manganese (Mn): 0.5% to 1.2%

Manganese is an element useful as a deoxidizer and a desulfurizing agent. In the present invention, in order to have the effect described above, manganese is preferably included in an amount of 0.5% or more, more preferably included in an amount of 0.52% or more. However, if the content of manganese is excessive, the strength of steel itself is significantly increased, and thus, deformation resistance of steel rapidly increases. Thus, a problem in which cold forgeability is deteriorated may occur. Thus, an upper limit of the content of manganese is preferably 1.2%, more preferably 1.0%.

Chromium (Cr): 0.3% to 0.9%

Chromium serves to promote transformation of ferrite and pearlite during hot rolling. In addition, while strength of steel itself is not increased more than necessary, a carbide in steel is precipitated and an amount of solid carbon is reduced, thereby contributing to a reduction in dynamic deformation aging caused by solid carbon. In the present invention, in order to have the effect described above, chromium is preferably included in an amount of 0.3% or more, more preferably included in an amount of 0.32% or more. However, if the content of chromium is excessive, by a segregation of chromium in a center segregation portion of a wire rod, hardness variations in each region of a wire rod increase, and strength of steel itself is significantly increased, so deformation resistance of steel rapidly increases. Thus, a problem in which cold forgeability is deteriorated may occur. Thus, an upper limit of the content of chromium is preferably 0.9%, more preferably 0.8%, further more preferably 0.6%.

Phosphorus (P): 0.02% or less

Phosphorus, an impurity which is inevitably contained, is segregated in grain boundaries to reduce toughness of steel, and is an element mainly responsible for a decrease in delayed fracture resistance. Thus, the content of phosphorus is preferably controlled to be as low as possible. Theoretically, it is advantageous to control the content of phosphorus to be 0%, but phosphorus is inevitably contained in a manufacturing process. Thus, it is important to manage an upper limit of phosphorus. In the present invention, the upper limit of the content of phosphorus is managed to be 0.02%.

Sulfur (S): 0.02% or less

Sulfur, an impurity which is inevitably contained, is segregated in grain boundaries to significantly reduce ductility, and is an element, a main cause of deterioration of delayed fracture resistance and stress relaxation characteristics by forming sulfide in steel. Thus, the content of sulfur is preferably controlled to be as low as possible. Theoretically, it is advantageous to control the content of sulfur to be 0%, but sulfur is inevitably contained in a manufacturing process. Thus, it is important to manage an upper limit of sulfur. In the present invention, the upper limit of the content of sulfur is managed to be 0.02%.

Soluble aluminum (Sol. Al): 0.01% to 0.05%

Aluminum is an element useful as a deoxidizer. In the present invention, in order to have the effect described above, aluminum is preferably included in an amount of 0.01% or more, more preferably included in an amount of 0.015% or more, further more preferable included in an amount of 0.02% or more. However, if the content of aluminum is excessive, by formation of AlN, an austenite grain refinement effect is increased, so cold forgeability may be lowered. Thus, in the present invention, an upper limit of the content of aluminum is managed to be 0.05%.

Nitrogen (N): 0.01% or less

Nitrogen is an impurity which is inevitably contained. If the content of nitrogen is excessive, an amount of solid nitrogen increases, so deformation resistance of steel rapidly increases. Thus, a problem in which cold forgeability is deteriorated may occur. Theoretically, it is advantageous to control the content of nitrogen to be 0%, but nitrogen is inevitably present in a manufacturing process. Thus, it is important to manage an upper limit of nitrogen. In the present invention, the upper limit of the content of nitrogen is managed to be 0.01%, more preferably managed to be 0.008%, further more preferably managed to be 0.007%.

The remainder of an alloy composition is iron (Fe). In addition, the wire rod of the present invention may include other impurities which may be included in an industrial production process of steel according to the related art. These impurities may be known to any person skilled in the art, and therefore the type and content of the impurities are not particularly limited in the present invention.

However, since Ti, Nb, and V correspond to representative impurities, of which contents are to be suppressed, in order to obtain the effect of the present invention, a brief description thereof will be provided below.

Titanium (Ti): 0.02% or less

Titanium is a carbonitride forming element. If titanium is included in steel, it may be advantageous to fix C and N. However, in this case, Ti (C,N) is precipitated to be coarse at a high temperature, so cold forgeability may be deteriorated. Thus, it is important to manage an upper limit of titanium. In the present invention, the upper limit of the content of titanium is preferably managed to be 0.02%, more preferably managed to be 0.015%.

Niobium (Nb) and Vanadium (V): 0.06% or less in total

Niobium and vanadium are also carbonitride forming elements. If the contents of niobium and vanadium are excessive, by precipitation strengthening due to formation of a fine carbonitride during cooling or grain refinement, strength of steel is increased more than necessary. Thus, cold forgeability may be deteriorated. Thus, it is important to manage upper limits of niobium and vanadium. In the present invention, the upper limit of the sum of the contents of niobium and vanadium is preferably managed to be 0.06%, more preferably managed to be 0.05%.

For example, a carbon equivalent (Ceq) of a wire rod of the present invention may be 0.23 or more and 0.33 or less. Here, the carbon equivalent (Ceq) may be defined by Equation 1. If the carbon equivalent (Ceq) is less than 0.23 or exceeds 0.33, it may be difficult to secure target strength.

$$Ceq=[C]+[Si]/9+[Mn]/5+[Cr]/12 \quad \text{[Equation 1]}$$

Where, each of [C], [Si], [Mn], and [Cr] is the content (%) of a corresponding element.

For example, the contents of Mn and Cr may satisfy Formula 3. If [Mn]/[Cr] is less than 1.2, it may be difficult to secure target strength. If [Mn]/[Cr] exceeds 1.8, by segregation of manganese and chromium in a center segregation portion of a wire rod, hardness variations in each region of a wire rod increase, so the possibility of cracking during cold forging may rapidly increase.

$$1.2 \leq [Mn]/[Cr] \leq 1.8 \quad \text{[Formula 3]}$$

Where, each of [Mn] and [Cr] is the content (%) of a corresponding element.

For example, the content of each of C, Mn, Cr, Nb, and V may satisfy Formula 4. If the content thereof does not satisfy Formula 4, by segregation in a central part, a difference in hardness between a center segregation portion of a wire rod and a non-segregation portion rapidly increases. Thus, during a cold forging process, the possibility of internal cracking may significantly increase.

$$9.33[C]+0.97[Mn]+0.51[Cr]+0.26[Nb]+0.66[V] \leq 2.1 \quad \text{[Formula 4]}$$

Where, each of [C], [Mn], [Cr], [Nb], and [V] is the content (%) of a corresponding element.

For example, a wire rod of the present invention may include ferrite and pearlite as a microstructure, more preferably, ferrite in an amount of 70% or more (excluding 100%) and pearlite in an amount of 30% or less (excluding 0%) in an area fraction. When the structure described above is secured, it has the advantage of securing excellent cold forgeability and securing strength after a proper wire drawing.

In addition, for example, an average grain size of ferrite may be 10 μm to 30 μm, more preferably 15 μm to 25 μm. If an average grain size of ferrite is less than 10 μm, due to grain refinement, strength increases, so cold forgeability may be reduced. On the other hand, if the average grain size of ferrite exceeds 30 μm, strength may decrease.

Meanwhile, an average grain size of pearlite, formed together with ferrite, is not particularly limited, because the average grain size of pearlite is influenced by an average grain size of ferrite. In this case, the average grain size refers to an average equivalent circular diameter of particles detected by observing a cross-section in a longitudinal direction of a wire rod.

For example, a wire rod of the present invention has an advantage of having excellent ductility with a cross-section reduction rate (RA) of 70% or more in a state of a wire rod.

For example, when a wire rod of the present invention is drawn in a drawing amount (D) of 5% to 25%, hardness of the wire rod after wire drawing may satisfy Formula 5. If the hardness of the wire rod after wire drawing does not satisfy Formula 5, an increase in strength caused by work hardening is significant, so cold forgeability may rapidly decrease.

$$(Hv_1-10 \leq (Hv_{,D,1/2d}+Hv_{,D,1/4d})/2 \leq Hv_1+10 \quad \text{[Formula 5]}$$

Where, $Hv_1$ refers to "$(Hv_{,1/2D}+Hv_{,1/4D})/2+85.45 \times \{1-\exp(-D/11.41)\}$", and each of $Hv_{,D,1/2d}$ and $Hv_{,D,1/4d}$ refers to hardness of the wire rod measured in a 1/2d position and a 1/4d position in the diameter direction of the wire rod after wire drawing.

The wire rod of the present invention for drawing described above may be manufactured in various methods, and a method for manufacturing the same is not particularly limited. However, as an exemplary embodiment, the wire rod may be manufactured by the following method.

Hereinafter, a method for manufacturing a wire rod having excellent cold forgeability, another aspect of the present disclosure, will be described in detail.

First, a billet satisfying the composition is heated. In this case, a heating temperature may be 1050° C. to 1250° C., preferably 1100° C. to 1200° C. If the heating temperature is less than 1050° C., hot deformation resistance increases, so productivity may be lowered. On the other hand, if the heating temperature exceeds 1250° C., a ferrite grain is significantly coarse, so ductility may be lowered.

Thereafter, the billet having been heated is hot rolled and a wire rod is obtained. In this case, a finish rolling temperature may be 900° C. to 1000° C., preferably 920° C. to 1000° C. If the finish rolling temperature is less than 900° C., due to ferrite grain refinement, strength increases, so deformation resistance may be increased. On the other hand, if the finish rolling temperature exceeds 1000° C., a ferrite grain is significantly coarse, so ductility may be lowered.

Thereafter, the wire rod is wound, and is then cooled. In this case, a winding temperature of the wire rod may be 800° C. to 900° C., preferably 800° C. to 850° C. If the winding temperature is less than 800° C., martensite in a surface layer, generated during cooling, is not recovered by heat recuperation, while tempered martensite is generated, so steel becomes hard and brittle. Thus, cold forgeability may be lowered. On the other hand, if the winding temperature exceeds 900° C., a thick scale is formed on a surface, so trouble may easily occur during descaling, and the cooling time is longer and thus productivity may be lowered.

Meanwhile, a cooling rate during the cooling may be 0.1° C./sec to 1° C./sec, preferably 0.3° C./sec to 0.8° C./sec. If a cooling rate is less than 0.1° C./sec, lamellar spacing in a pearlite structure is widened, so ductility may be insufficient. If the cooling rate exceeds 1° C./sec, a ferrite fraction decreases, so cold forgeability may be lowered.

MODE FOR INVENTION

Hereinafter, the present disclosure will be described in more detail through examples. However, the description of these examples is for the purpose of illustrating the practice of the present disclosure, but the present disclosure is not limited by the description of these examples. The scope of the present disclosure is determined by the matters described in the appended claims and the matters reasonably deduced therefrom. A billet having the composition described in Table 1 was heated at 1200° C. for 8 hours, and was then hot rolled to a wire diameter of 25 mm to manufacture a wire rod. In this case, a finish rolling temperature was constant, 950° C., and a rolling ratio was constant, 80%. Thereafter, the wire rod was wound at a temperature of 850° C., and was then cooled at a rate of 0.5° C./sec. Thereafter, a microstructure of the wire rod, having been cooled, was observed, and hardness thereof was measured in a 1/2d position and a 1/4d position in the diameter direction of the wire rod. A result thereof is illustrated in Table 2.

In addition, cold forgeability of the wire rod having been cooled was evaluated, and is illustrated in Table 2. A notch compression specimen was subjected to a compression test in which true strain is 0.8, and cold forgeability was evaluated by whether cracking occurred. If cracking did not occur, cold forgeability was evaluated as "GO". If cracking occurred, cold forgeability was evaluated as "NG".

TABLE 1

| STEEL | ALLOY COMPOSITION (WT %) | | | | | | | | | | | ① | ② | ③ |
|---|---|---|---|---|---|---|---|---|---|---|---|---|---|---|
| | C | Si | Mn | P | S | Cr | Al | Nb | V | Ti | N | | | |
| INVENTIVE STEEL1 | 0.04 | 0.15 | 0.92 | 0.012 | 0.0050 | 0.58 | 0.02 | — | — | — | 0.0045 | 0.289 | 1.59 | 1.56 |
| INVENTIVE STEEL2 | 0.06 | 0.16 | 0.83 | 0.011 | 0.0062 | 0.51 | 0.03 | 0.004 | 0.040 | — | 0.0044 | 0.286 | 1.63 | 1.65 |
| INVENTIVE STEEL3 | 0.08 | 0.17 | 0.75 | 0.011 | 0.0054 | 0.42 | 0.04 | — | 0.050 | — | 0.0042 | 0.284 | 1.79 | 1.72 |
| INVENTIVE STEEL4 | 0.09 | 0.11 | 0.56 | 0.010 | 0.0057 | 0.32 | 0.02 | — | — | — | 0.0053 | 0.241 | 1.75 | 1.55 |
| INVENTIVE STEEL5 | 0.11 | 0.16 | 0.68 | 0.013 | 0.0064 | 0.43 | 0.03 | — | — | — | 0.0052 | 0.300 | 1.58 | 1.91 |
| INVENTIVE STEEL6 | 0.13 | 0.17 | 0.62 | 0.011 | 0.0052 | 0.35 | 0.02 | | | 0.015 | 0.0048 | 0.302 | 1.77 | 1.99 |
| INVENTIVE STEEL7 | 0.13 | 0.20 | 0.59 | 0.012 | 0.0046 | 0.39 | 0.03 | — | — | — | 0.0040 | 0.303 | 1.51 | 1.98 |
| INVENTIVE STEEL8 | 0.14 | 0.18 | 0.52 | 0.011 | 0.0061 | 0.40 | 0.03 | — | — | — | 0.0037 | 0.297 | 1.30 | 2.01 |
| COMPARATIVE STEEL1 | 0.08 | 0.17 | 1.22 | 0.011 | 0.0054 | 0.22 | 0.03 | — | — | — | 0.0055 | 0.363 | 5.59 | 2.05 |
| COMPARATIVE STEEL2 | 0.09 | 0.15 | 1.11 | 0.011 | 0.0067 | 0.31 | 0.04 | 0.008 | 0.060 | — | 0.0053 | 0.355 | 3.58 | 2.12 |
| COMPARATIVE STEEL3 | 0.10 | 0.14 | 0.96 | 0.012 | 0.0051 | 0.28 | 0.03 | — | 0.090 | — | 0.0047 | 0.331 | 3.43 | 2.07 |
| COMPARATIVE STEEL4 | 0.12 | 0.13 | 0.85 | 0.010 | 0.0062 | 0.34 | 0.02 | — | — | — | 0.0045 | 0.333 | 2.50 | 2.12 |
| COMPARATIVE STEEL5 | 0.13 | 0.16 | 0.81 | 0.013 | 0.0065 | 0.22 | 0.03 | — | — | 0.024 | 0.0052 | 0.328 | 3.68 | 2.11 |
| COMPARATIVE STEEL6 | 0.14 | 0.15 | 0.78 | 0.012 | 0.0072 | 0.92 | 0.02 | | | | 0.0055 | 0.389 | 0.85 | 2.53 |
| COMPARATIVE STEEL7 | 0.15 | 0.18 | 0.82 | 0.011 | 0.0063 | 0.95 | 0.03 | 0.006 | 0.050 | | 0.0048 | 0.413 | 0.86 | 2.71 |
| COMPARATIVE STEEL8 | 0.15 | 0.12 | 0.84 | 0.010 | 0.0057 | 1.00 | 0.04 | | | | 0.0051 | 0.415 | 0.84 | 2.72 |
| COMPARATIVE STEEL9 | 0.17 | 0.18 | 0.75 | 0.011 | 0.0052 | 0.31 | 0.03 | — | — | — | 0.0046 | 0.366 | 2.42 | 2.47 |
| COMPARATIVE STEEL10 | 0.21 | 0.21 | 0.68 | 0.010 | 0.0060 | 0.23 | 0.02 | — | — | — | 0.0048 | 0.389 | 2.96 | 2.74 |
| COMPARATIVE STEEL11 | 0.25 | 0.23 | 0.70 | 0.011 | 0.0048 | 0.11 | 0.02 | — | — | — | 0.0054 | 0.425 | 6.36 | 3.07 |

Here, ① = [C] + [Si]/9 + [Mn]/5 + [Cr]/12, ② = [Mn]/[Cr], and ③ = 9.33[C] + 0.97[Mn] + 0.51[Cr] + 0.26[Nb] + 0.66[V]
Each of [C], [Si], [Mn], [Cr], [Nb], [V] refers to the content (%) of the corresponding element

TABLE 2

| STEEL | MICROSTRUCTURE | FERRITE FRACTION (AREA %) | FERRITE AVERAGE GRAIN SIZE (μm) | ① | ② | COLD WORK-ABILITY |
|---|---|---|---|---|---|---|
| INVENTIVE STEEL1 | FERRITE + PEARLITE | 85 | 23 | 121.5 | 1.03 | GO |
| INVENTIVE STEEL2 | FERRITE + PEARLITE | 83 | 22 | 140.6 | 1.05 | GO |
| INVENTIVE STEEL3 | FERRITE + PEARLITE | 82 | 20 | 140.5 | 1.06 | GO |
| INVENTIVE STEEL4 | FERRITE + PEARLITE | 80 | 21 | 121.2 | 1.02 | GO |
| INVENTIVE STEEL5 | FERRITE + PEARLITE | 78 | 18 | 136.3 | 1.08 | GO |
| INVENTIVE STEEL6 | FERRITE + PEARLITE | 77 | 19 | 141.5 | 1.11 | GO |
| INVENTIVE STEEL7 | FERRITE + PEARLITE | 76 | 17 | 140.7 | 1.10 | GO |
| INVENTIVE STEEL8 | FERRITE + PEARLITE | 74 | 16 | 142.5 | 1.14 | GO |
| COMPARATIVE STEEL1 | FERRITE + PEARLITE | 82 | 20 | 145.8 | 1.22 | GO |
| COMPARATIVE STEEL2 | FERRITE + PEARLITE | 81 | 12 | 170.0 | 1.27 | GO |
| COMPARATIVE STEEL3 | FERRITE + PEARLITE | 80 | 13 | 165.5 | 1.23 | GO |
| COMPARATIVE STEEL4 | FERRITE + PEARLITE | 77 | 18 | 146.3 | 1.28 | GO |
| COMPARATIVE STEEL5 | FERRITE + PEARLITE | 76 | 11 | 152.2 | 1.26 | GO |
| COMPARATIVE STEEL6 | FERRITE + PEARLITE | 73 | 19 | 159.4 | 1.30 | GO |

TABLE 2-continued

| STEEL | MICROSTRUCTURE | FERRITE FRACTION (AREA %) | FERRITE AVERAGE GRAIN SIZE (μm) | ① | ② | COLD WORK-ABILITY |
|---|---|---|---|---|---|---|
| COMPARATIVE STEEL7 | FERRITE + PEARLITE | 72 | 16 | 177.0 | 1.31 | GO |
| COMPARATIVE STEEL8 | FERRITE + PEARLITE | 70 | 17 | 168.6 | 1.32 | GO |
| COMPARATIVE STEEL9 | FERRITE + PEARLITE | 73 | 17 | 161.3 | 1.30 | GO |
| COMPARATIVE STEEL10 | FERRITE + PEARLITE | 71 | 16 | 170.3 | 1.32 | GO |
| COMPARATIVE STEEL11 | FERRITE + PEARLITE | 68 | 15 | 185.8 | 1.36 | GO |

① = $(Hv,_{1/2d} + Hv,_{1/4d})/2$, ② = $Hv,_{1/2d}/Hv,_{1/4d}$

Thereafter, a drawing amount of 10%, 20%, and 30% was applied to each wire rod, and a steel wire was manufactured. Hardness of each steel wire, having been manufactured, was measured in a 1/2d position and a 1/4d position in the diameter direction, and cold forgeability was evaluated. A result thereof is illustrated in Table 3.

TABLE 3

| STEEL | $(Hv,_{D,1/2d} + Hv,_{D,1/4d})/2$ | | | COLD WORKABILITY | | |
|---|---|---|---|---|---|---|
| | 10% | 20% | 30% | 10% | 20% | 30% |
| INVENTIVE STEEL1 | 177.3 | 198.1 | 206.8 | GO | GO | GO |
| INVENTIVE STEEL2 | 192.4 | 213.2 | 221.8 | GO | GO | GO |
| INVENTIVE STEEL3 | 191.9 | 212.7 | 221.3 | GO | GO | GO |
| INVENTIVE STEEL4 | 169.6 | 190.4 | 199.0 | GO | GO | GO |
| INVENTIVE STEEL5 | 186.2 | 206.9 | 215.6 | GO | GO | GO |
| INVENTIVE STEEL6 | 189.9 | 210.6 | 219.3 | GO | GO | GO |
| INVENTIVE STEEL7 | 190.6 | 211.3 | 220.0 | GO | GO | GO |
| INVENTIVE STEEL8 | 193.2 | 214.0 | 222.6 | GO | GO | GO |
| COMPARATIVE STEEL1 | 197.4 | 219.1 | 226.8 | GO | GO | NG |
| COMPARATIVE STEEL2 | 224.3 | 243.1 | 255.8 | GO | NG | NG |
| COMPARATIVE STEEL3 | 218.4 | 238.1 | 245.8 | GO | NG | NG |
| COMPARATIVE STEEL4 | 197.5 | 219.2 | 223.9 | GO | GO | NG |
| COMPARATIVE STEEL5 | 198.1 | 222.9 | 231.5 | GO | GO | NG |
| COMPARATIVE STEEL6 | 211.7 | 232.6 | 240.6 | GO | NG | NG |
| COMPARATIVE STEEL7 | 231.4 | 250.8 | 259.4 | GO | NG | NG |
| COMPARATIVE STEEL8 | 217.8 | 238.2 | 247.8 | GO | NG | NG |
| COMPARATIVE STEEL9 | 211.2 | 233.0 | 242.6 | GO | NG | NG |
| COMPARATIVE STEEL10 | 219.2 | 237.9 | 249.6 | GO | NG | NG |
| COMPARATIVE STEEL11 | 235.7 | 254.5 | 264.1 | GO | NG | NG |

As can be seen from Table 3, in the case of Inventive Examples 1 to 8 satisfying an alloy composition and manufacturing conditions proposed in the present invention, an average hardness of a wire rod and a hardness ratio of a center segregation portion and a non-segregation portion of a wire rod satisfy a range proposed in the present invention and it can be seen that cold forgeability is excellent. On the other hand, in the case of Comparative Examples 1 to 11, a hardness ratio of a center segregation portion and a non-segregation portion of a wire rod exceeds a range proposed in the present invention. Thus, cracking occurred inside during cold forging after wire drawing, and cold forgeability was inferior, as compared to Inventive Steel.

The invention claimed is:

1. A wire rod, comprising:
   carbon (C): 0.02 wt % to 0.14 wt %, silicon (Si): 0.05 wt % to 0.3 wt %, manganese (Mn): 0.5 wt % to 1.2 wt %, chrome (Cr): 0.3 wt % to 0.9 wt %, phosphorus (P): 0.02 wt % or less, sulfur (S): 0.02 wt % or less, soluble aluminum (sol. Al): 0.01 wt % to 0.05 wt %, nitrogen (N): 0.008 wt % or less, iron (Fe) as a remainder, and unavoidable impurities,
   wherein, the wire rod satisfies Formula 1 and Formula 2, when the hardness of the wire rod, measured in a 1/2d position and in a 1/4d position in the diameter direction of the wire rod, are Hv, $_{1/2}$(HV) and Hv, $_{1/4}$(HV), respectively, $(Hv_{1/2d}+Hv_{1/4d})/2 \leq 150$ [Formula 1]

$Hv_{1/2d}/Hv_{1/4d} \leq 1.2$ [Formula 2]

where d is the diameter of the wire.

2. The wire rod of claim 1, wherein the unavoidable impurities include titanium (Ti), niobium (Nb), and vanadium (V), and are suppressed to 0.02 wt % or less of Ti, as well as 0.06 wt % or less of Nb and V in total.

3. The wire rod of claim 1, wherein a carbon equivalent (Ceq) defined by Equation 1 is 0.23 or more and 0.33 or less, $Ceq=[C]+[Si]/9+[Mn]/5+[Cr]/12$ [Equation 1]

where each of [C], [Si], [Mn], and [Cr] is the content (%) of a corresponding element.

4. The wire rod of claim 1, wherein the wire rod satisfies Formula 3, $1.2 \leq [Mn]/[Cr] \leq 1.8$ [Formula 3]

where each of [Mn] and [Cr] is the content (%) of a corresponding element.

5. The wire rod of claim 1, wherein the wire rod satisfies Formula 4, $9.33[C]+0.97[Mn]+0.51[Cr]+0.26[Nb]+0.66[V] \leq 2.1$ [Formula 4]

where each of [C], [Mn], [Cr], [Nb], and [V] is the content (%) of a corresponding element.

6. The wire rod of claim 1, including ferrite and pearlite, as a microstructure.

7. The wire rod of claim 1, including ferrite of 70 area % or more (excluding 100 area %) and pearlite of 30 area % or less (excluding 0 area %), as a microstructure.

8. The wire rod of claim 6, wherein an average grain size of the ferrite is 10 μm to 30 μm.

9. The wire rod of claim 1, wherein, during wire drawing in a drawing amount (D) of 5% to 25%, hardness of the wire rod after the wire drawing satisfies Formula 5, $(Hv,_1-10 \leq (Hv,_{D,1/2d}+Hv,_{D,1/4d})/2 \leq Hv,_1+10$ [Formula 5]

where, $Hv,_1$ is "$(Hv,_{1/2D}+Hv,_{1/4D})/2+85.45 \times \{1-\exp(-D/11.41)\}$", and $Hv,_{D,1/2d}$ and $Hv,_{D,1/4d}$ are hardness of the wire rod, measured in a 1/2d position and a 1/4d position in the diameter direction of the wire rod after the wire drawing, respectively.

10. A method for manufacturing a wire rod, comprising:
heating a billet, including carbon (C): 0.02 wt % to 0.14 wt %; silicon (Si): 0.05 wt % to 0.3 wt %; manganese (Mn): 0.5 wt % to 1.2 wt %; chrome (Cr): 0.3 wt % to 0.9 wt %; phosphorus (p): 0.02 wt % or less; sulfur (S): 0.02 wt % or less; soluble aluminum (sol. Al): 0.01 wt % to 0.05 wt %; nitrogen (N): 0.008 wt % or less; iron (Fe) as a remainder and unavoidable impurities, in which a carbon equivalent (Ceq) defined by Equation 1 is 0.23 or more and 0.33 or less, and which satisfies Formula 3 and Formula 4;

obtaining the wire rod by hot-rolling the billet having been heated under the conditions of a finish rolling temperature of 900° C. to 1000° C.; and cooling, after winding the wire rod, $$Ceq=[C]+[Si]/9+[Mn]/5+[Cr]/12 \quad \text{[Equation 1]}$$

$$1.2 \leq [Mn]/[Cr] \leq 1.8 \quad \text{[Formula 3]}$$

$$9.33[C]+0.97[Mn]+0.51[Cr]+0.26[Nb]+0.66[V] \leq 2.1 \quad \text{[Formula 4]}$$

where each of [C], [Si], [Mn], [Cr], [Nb], and [V] is the content (%) of a corresponding element, and wherein, during the winding, a winding temperature is 800° C. to 900° C.

11. The method for manufacturing a wire rod of claim 10, wherein the unavoidable impurities include titanium (Ti), niobium (Nb), and vanadium (V), and are suppressed to 0.02 wt % or less of Ti, as well as 0.06 wt % or less of Nb and V in total.

12. The method for manufacturing a wire rod of claim 10, wherein, during the heating, a heating temperature is 1050° C. to 1250° C.

13. The method for manufacturing a wire rod of claim 10, wherein, during the cooling, a cooling rate is 0.1° C./sec to 1° C./sec.

14. The wire rod of claim 7, wherein an average grain size of the ferrite is 10 μm to 30 μm.

* * * * *